United States Patent
Annaluru et al.

(10) Patent No.: US 10,057,193 B2
(45) Date of Patent: Aug. 21, 2018

(54) CARDINALITY BASED PACKET PROCESSING IN SOFTWARE-DEFINED NETWORKING (SDN) SWITCHES

(71) Applicant: Fortinet, Inc., Sunnyvale, CA (US)

(72) Inventors: Sashidhar V. Annaluru, Cupertino, CA (US); Venkateswara Adusumilli, San Jose, CA (US); Che-Lin Ho, San Jose, CA (US); Shivashakara Desigowda, San Jose, CA (US); Edward Lopez, South Riding, VA (US)

(73) Assignee: Fortinet, Inc., Sunnyvale, CA (US)

(*) Notice: Subject to any disclaimer, the term of this patent is extended or adjusted under 35 U.S.C. 154(b) by 220 days.

(21) Appl. No.: 14/985,783

(22) Filed: Dec. 31, 2015

(65) Prior Publication Data
US 2017/0195257 A1   Jul. 6, 2017

(51) Int. Cl.
| | |
|---|---|
| *H04L 12/935* | (2013.01) |
| *H04L 12/937* | (2013.01) |
| *H04L 12/741* | (2013.01) |
| *H04L 12/721* | (2013.01) |
| *G06F 15/80* | (2006.01) |
| *H04L 12/725* | (2013.01) |

(52) U.S. Cl.
CPC .......... *H04L 49/253* (2013.01); *H04L 45/745* (2013.01); *H04L 49/30* (2013.01); *G06F 15/8007* (2013.01); *H04L 45/306* (2013.01); *H04L 45/38* (2013.01)

(58) Field of Classification Search
None
See application file for complete search history.

(56) References Cited

U.S. PATENT DOCUMENTS

| | | | |
|---|---|---|---|
| 7,539,845 B1* | 5/2009 | Wentzlaff | ............ G06F 15/8007 |
| | | | 712/10 |
| 9,269,439 B1 | 2/2016 | Levy et al. | |
| 9,407,549 B2 | 8/2016 | Mosko et al. | |
| 9,565,135 B2* | 2/2017 | Li | ........................ H04L 41/0806 |
| 9,692,689 B2* | 6/2017 | Arumugam | ............ H04L 45/38 |
| 2013/0230047 A1 | 9/2013 | Subrahmaniam et al. | |
| 2014/0241356 A1 | 8/2014 | Zhang et al. | |

(Continued)

OTHER PUBLICATIONS

"OpenFlow Switch Specification." Open Networking Foundation. Oct. 14, 2013. 206 pgs.

(Continued)

*Primary Examiner* — Vinncelas Louis
(74) *Attorney, Agent, or Firm* — Hamilton, DeSanctis & Cha LLP

(57) ABSTRACT

Systems and methods for scalable SDN devices having ports/network interfaces mapped to cardinal flow processing (CFP) units are provided. According to one embodiment, an incoming packet is received, at a software-defined networking (SDN) switch. An ingress port on which the incoming packet was received is determined. A cardinal direction to which the ingress port is mapped is determined. Based on the determined cardinal direction, the SDN switch identifies a cardinal flow processing (CFP) unit within the SDN switch with which the determined cardinal direction is associated. The SDN switch then causes the incoming packet to be processed by the identified CFP unit.

26 Claims, 7 Drawing Sheets

(56) References Cited

U.S. PATENT DOCUMENTS

| | | |
|---|---|---|
| 2015/0003281 A1* | 1/2015 | Hasenplaugh .......... H04L 41/12 370/254 |
| 2015/0026800 A1 | 1/2015 | Jain |
| 2015/0180783 A1 | 6/2015 | Crasta et al. |
| 2016/0065452 A1 | 3/2016 | Kruglick |
| 2016/0072717 A1 | 3/2016 | Ansari et al. |
| 2016/0094449 A1 | 3/2016 | Ramia et al. |
| 2016/0094460 A1 | 3/2016 | Shelar et al. |
| 2016/0182378 A1 | 6/2016 | Basavaraja et al. |
| 2016/0218973 A1 | 7/2016 | Anand et al. |
| 2016/0301603 A1 | 10/2016 | Park et al. |
| 2016/0315880 A1 | 10/2016 | Guo et al. |
| 2017/0041230 A1 | 2/2017 | Huang et al. |
| 2017/0149640 A1 | 5/2017 | Narayanan et al. |
| 2017/0180234 A1 | 6/2017 | Agrawal et al. |
| 2017/0195253 A1 | 7/2017 | Annaluru et al. |
| 2017/0195254 A1 | 7/2017 | Pham et al. |
| 2017/0195255 A1 | 7/2017 | Pham et al. |
| 2017/0195292 A1 | 7/2017 | Pham et al. |

OTHER PUBLICATIONS

Non-Final Rejection for U.S. Appl. No. 14/985,746 dated Jul. 13, 2017.
Non-Final Rejection for U.S. Appl. No. 14/985,827 dated Oct. 6, 2017.
Non-Final Rejection for U.S. Appl. No. 14/985,819 dated Aug. 25, 2017.

* cited by examiner

500 ⟶

| Ingress Port Value 504 | Cardinal Direction 502 | Cardinal Flow Processing (CFP) Unit 506 |
|---|---|---|
| Port-S-001 (550-1) | South | CFP-S (542-1) |
| Port-W-001 (550-2) | West | CFP-W (542-3) |
| Port-E-001 (550-3) | East | CFP-E (542-2) |
| Port-N-001 (550-4) | North | CFP-N (542-4) |

FIG. 5A

CARDINALITY BASED PACKET PROCESSING IN SOFTWARE-DEFINED NETWORKING (SDN) SWITCHES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2015, Fortinet, Inc.

BACKGROUND

Field

Embodiments of the present invention generally relate to software-defined networking (SDN) devices. In particular, embodiments of the present invention relate to scalable SDN devices having ports/network interfaces mapped to cardinal flow processing (CFP) units.

Description of the Related Art

With network traffic increasing rapidly day by day, it is becoming harder for hardware based switches or network security devices to provide required scalability. In order to overcome limitations of existing hardware-based switches/network security devices, SDN devices have been proposed for providing scalable and fast processing of network packets. Existing SDN devices, such as SDN switches, are replacing traditional routers and switches in several high-end applications including emerging cloud and datacenter environments where a large amount of traffic needs to be monitored and filtered. In a typical implementation of SDN, an Internet Protocol (IP) packet needs to traverse through different network functions or security checks before the packet is forwarded to the final destination. SDN is an approach to computer networking that allows network administrators to manage network services through abstraction of lower-level functionality, which is done by decoupling the operating system that makes decisions about where traffic is sent (the control plane) from the underlying hardware systems that forwards traffic to the selected destination (the data plane).

In most cases, these SDN devices, which may also be interchangeably referred to as SDN switches hereinafter, are relatively commoditized units using Ternary Content-Addressable Memory (TCAM)-based platforms that have been enabled to make use of programmed flow statements to perform packet forwarding decisions, either in lieu of or in concert with forwarding tables generated by traditional routing and switching protocols.

The first-generation of these SDN switches, though economical to manufacture, have significant limitations in terms of traffic volume that these switches can handle. Such SDN switches maintain a table having multiple entries where each entry signifies different properties of the packet that need to be checked in a typical single-table pipeline architecture used by these SDN switches before the SDN switches can make the forwarding decision. The first generation SDN switches, which can be single-TCAM switches, have acceptable forwarding properties when evaluating a small number of fields, such as a Media Access Control (MAC) address or IP address in a table. However, such SDN switches lack scalability, particularly when the number of entries in a table that needs to be checked before making the forwarding decision increases. While single-TCAM switches can have acceptable forwarding properties when evaluating a small number of fields in a flow table, if the flow table entries have a large number of fields (as is the case in the OpenFlow protocols, including, but not limited to Open Networking Foundation (ONF), "OpenFlow Switch Specification," Version 1.5.0 (Protocol version 0x06), Dec. 19, 2014 (hereafter, the "OpenFlow Protocol," which is hereby incorporated by reference in its entirety for all purposes), are now being used. For example, when using the OpenFlow Protocol, which defines a minimum of thirteen fields within a single-table pipeline, the number of supported flow-table entries by these SDN switches is dramatically reduced. Even increasing the size of the TCAM is not a practical solution as TCAMs have finite data paths, and increasing the size can result in significant performance bottlenecks for the network security devices, such as SDM switches.

In order to overcome the above-mentioned limitations, use of multi-table pipelines has been proposed, in which Field Programmable Gate Arrays (FPGAs) and memory or Dynamic Random Access Memory (DRAM) can be used to conduct high-performance searches of simple tables, and where microcode within the FPGAs can be used to discretely mimic TCAM search functions on a limited basis. However, this forces the use of multi-table packet processing pipelines as compared to the simplicity of single-table pipelines supported by true TCAMs.

To further overcome limitations and provide scalability, second-generation SDN switches have been proposed, which use dedicated hardware that is intended to overcome size and performance limitations associated with first generation (single-TCAM) switches. Most of the existing second-generation SDN switches use larger TCAMs, FPGAs+memory, or both, wherein these switches have to maintain a tradeoff between performance and programmable flow table size. For instance, ZNYX ZX1200-SDN and B2-SDN switches claim to support 300K OpenFlow Protocol programmed flow statements, but are limited to an aggregate performance of about 35 Gbps. Noviflow Noviswitch line claims support for 100-240 Gbps and incorporates an 'Optimized TCAM' architecture but these performance values can only be attained with multi-table pipelines.

These existing solutions, along with others, are therefore do not meet the performance levels required by dedicated hardware solutions for high-end applications, such as cloud and datacenter environments, particularly for network security functions. In a majority of use-cases, such datacenter environments and clouds require dedicated SDN switch solution support for around 200K flows even when using single-table pipelines, aggregate switching performance of 640 Gbps based on support of a 16 spine spine-leaf architecture at 10 Gbps per connection. Also, as the number of network security functions/services that need to be performed on an IP packet before making a forwarding decision increases, performance of existing network security devices may be further degraded. However, it has been observed that it is not required by the network security devices to perform all the security functions/services in similar manner for all the incoming packets. There may be some packets that require only selected security functions/services, for which the routing decisions can be made based on the selected security function/service itself. Performance of SDN devices can therefore be improved by selectively performing only the required security function/service on the packet before making the routing/forwarding decision.

There is therefore a need for systems and methods for providing scalable and high performance SDN devices that enable selective packet steering capabilities to a network security device for selectively forwarding packets to flow through a network service. Systems and methods are also required for providing maximum programmable flow capacity, high throughput performance, and flexible pipeline programmability.

SUMMARY

Systems and methods are described for scalable SDN devices having ports/network interfaces mapped to cardinal flow processing (CFP) units. According to one embodiment, an incoming packet is received, at a software-defined networking (SDN) switch. An ingress port on which the incoming packet was received is determined. A cardinal direction to which the ingress port is mapped is determined. Based on the determined cardinal direction, the SDN switch identifies a cardinal flow processing (CFP) unit within the SDN switch with which the determined cardinal direction is associated. The SDN switch then causes the incoming packet to be processed by the identified CFP unit.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 5A-5C illustrate an exemplary mapping between ports and cardinal directions, and between cardinal directions and CFP units responsible for processing packets received at the mapped ports in accordance with an embodiment of the present invention.

DETAILED DESCRIPTION

Figure 1:
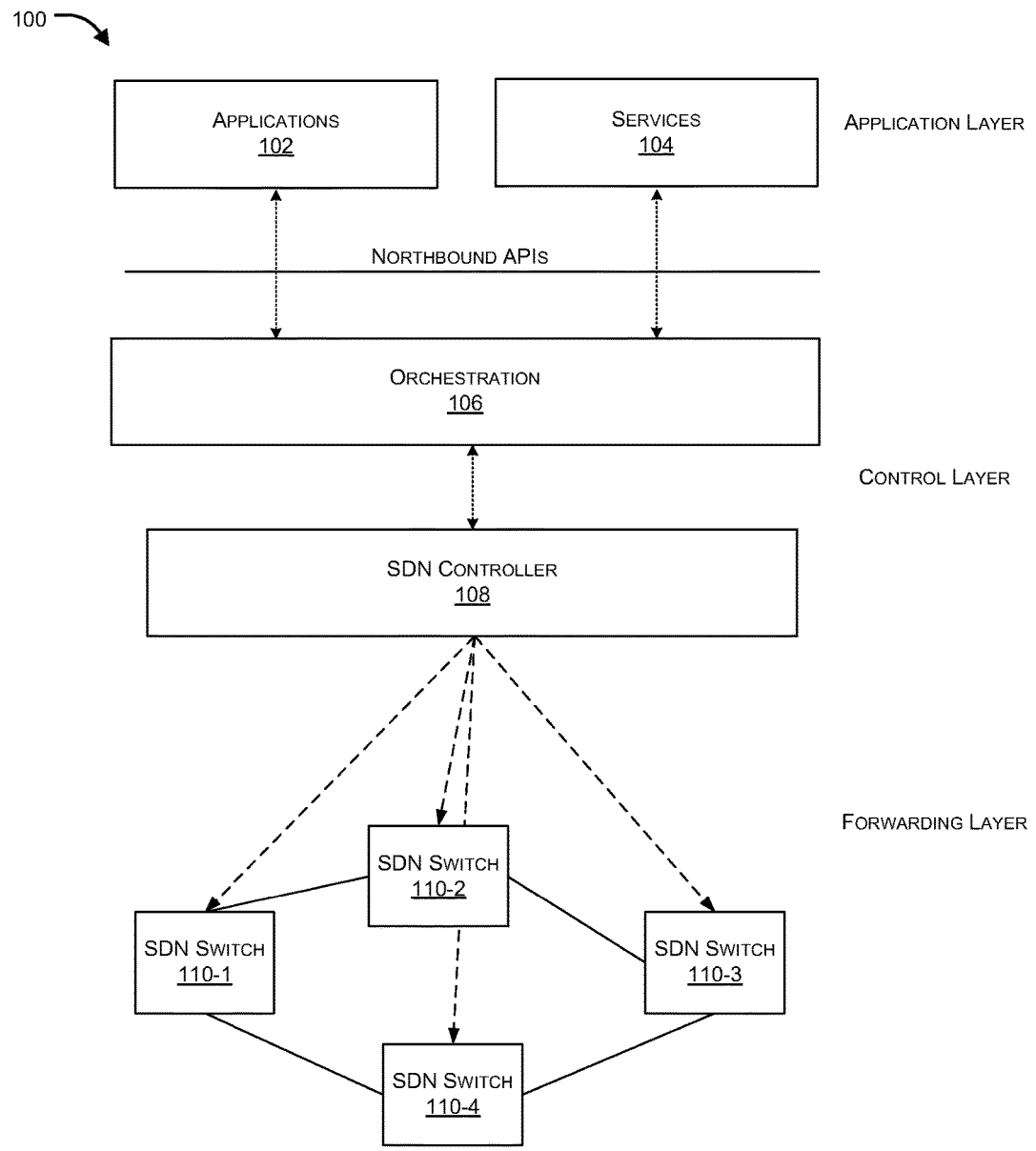
FIG. 1 illustrates an exemplary layered architecture having SDN switches and an SDN controller configured therein in accordance with an embodiment of the present invention.

Systems and methods are described for scalable and high-performance SDN security devices that incorporate a cardinal flow processing (CFP) architecture that combines the scalability and performance of using FPGAs and memory with the flexibility of using TCAMs for complex packet matching searches. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

Embodiments of the present disclosure generally relate to SDN devices. In particular, embodiments of the present disclosure relate to scalable SDN devices having ports/network interfaces that are mapped to cardinal flow processing (CFP) units.

Aspects of the present disclosure relate to an SDN switch that includes multiple ingress ports, each port being associated with a respective ingress port value; and multiple cardinal flow processing (CFP) units, wherein at least one port is directly mapped to at least one CFP unit such that an incoming packet having an ingress port value of the at least one port is processed by the at least one CFP unit.

In aspect, the ingress port value of the at least one port can be associated with a cardinal direction, and wherein the cardinal direction can be associated with the at least one CFP unit. In another aspect, representation of the ingress port value of the at least one port can include a cardinal notation. In another aspect, the ingress port value of the at least one port is mapped with its respective cardinal notation based on a table. In yet another aspect, the cardinal direction that the at least one port is associated with can be selected from South, North, East, and West Directions. In an aspect, a CFP unit associated with port having the South cardinal direction can be configured to identify a profile of the incoming packet or service chain to be followed for the incoming packet. In another aspect, a CFP unit associated with a port having the East or West cardinal direction can be configured to identify whether an additional service is needed to be applied in a service chain or whether the incoming packet is to be forwarded to the destination. On the other hand, a CFP unit associated with a port having the North cardinal direction can be configured to check whether the incoming packet requires processing by services in the reverse path.

In an aspect, the SDN switch can be operatively coupled with an SDN controller, wherein the SDN controller can store information regarding cardinal directions that are associated with one or more of the ingress ports. In an exemplary implementation, the SDN switch can parse the incoming packet to retrieve the ingress port value indicated by the incoming packet. In an aspect, the at least one port can be associated with a parameter selected from one or a combination of a defined port speed, a packet encapsulation characteristic, a port attribute, or a packet parameter, and wherein the parameter can be associated with the at least one CFP unit.

In another aspect, each of the CFP units can include an FPGA for processing an incoming packet through a pipeline, a TCAM that can be configured to provide network search processing, and a memory configured as a cache memory. The TCAM can be configured to handle single-table and/or multi-table pipelines.

In another aspect, the SDN switch can further include a central processing unit (CPU) that can be configured to receive flow statements from SDN controller that the SDN switch is associated with, wherein the CPU can be configured to program the CFP units. In an aspect, the SDN switch can further include a local switch fabric that can be configured as a forwarding engine to forward the incoming packet between external network interfaces, the CFP units, and the CPU.

In an aspect, the present disclosure can further relate to a system that can include a packet receive module that can be configured to, at an SDN switch, receive an incoming packet, and an ingress port extraction module that can be configured to, at the SDN switch, determine a port on which the incoming packet is received. The system can further include an ingress-port based cardinal direction determination module that can be configured to, at the SDN switch, determine a cardinal direction to which the port is mapped, and a cardinal direction based flow processing unit assignment module that can be configured to, at the SDN switch, determine a cardinal flow processing (CFP) unit of multiple CFP units that the cardinal direction is associated with. The system can further include an assigned flow processing unit based packet processing module that can be configured to, at the SDN switch, process the incoming packet at the determined CFP unit of the SDN switch.

Aspects of the present disclosure can further relate to a method for packet flow processing comprising the steps of receiving, at an SDN switch, an incoming packet, and determining, at the SDN switch, port on which the incoming packet is received. The method can further comprise the steps of determining, at the SDN switch, a cardinal direction to which the port is mapped, and determining, at the SDN switch, a cardinal flow processing (CFP) unit of multiple CFP units that the cardinal direction is associated with; and processing, at the SDN switch, the incoming packet at the determined CFP unit of the SDN switch.

FIG. 1 illustrates an exemplary layered architecture 100 having SDN switches 110 and an SDN controller 108 configured therein in accordance with an embodiment of the present invention. As those skilled in the art will appreciate, SDN networks present many advantages over traditional monolithic architecture networks. For example, control plane applications that implement important network routing and switching functionalities are completely separated from the forwarding plane. Maintaining a centralized control plane enables highly customized and optimized networking services that can be tailored to specific user needs or a specific network setup. A centralized control plane provides a highly scalable, reliable, and flexible networking infrastructure that can cater to diverse user needs. Although embodiments of the present invention may be described herein with reference to a centralized control plane, in different implementations, it is possible to have a localized control plane for configuring the SDN switches.

SDN abstracts the functionality of legacy hardware into three layers, an application layer, a control layer, and a forwarding layer, where the application layer includes applications and network services that are used to determine forwarding requirements, control layer converts forwarding information into flow-programmable statements (can use orchestration), and forwarding layer controls and configures flow-programmable hardware used to forward traffic.

In an embodiment, the application layer can include one or more applications 102 and one or more services 104 that can deliver open programmable interfaces to automate orchestration of network services, wherein SDN applications 102 present in the application layer can explicitly, directly, and programmatically communicate their network requirements and desired network behavior to an orchestration engine 106 and SDN controller 108 via northbound application programming interface (API). In an embodiment, services 104 can include network security services, including, but not limited to, anti-malware services, anti-spam services, application control services, web filtering and IP reputation services, among other similar services. In an aspect, the northbound APIs can be used for communication between the application layer and the control layer to support symmetric traffic flows and for enabling implementation of network security functions (NSFs).

In an exemplary implementation, the forwarding layer of architecture 100 can include one or more SDN switches such as 110-1, 110-2, . . . , 110-N, which may be collectively referred to as SDN switches 110 hereinafter, wherein SDN switches 110 can be configured to use assigned cardinality for processing data packets received by switches 110. In an exemplary aspect of the present disclosure, each SDN switch 110 can include one or more ports having respective port values, wherein each port can be assigned/associated with a cardinal direction and wherein each cardinal direction can be associated with a specific flow processing unit such that when an incoming packet is received by an SDN switch 110, its port value can be retrieved to determine the associated cardinal direction, and accordingly transmit the packet to a flow processing unit that is assigned to/mapped with the determined cardinal direction.

In an aspect, SDN switch 110 can include multiple of ports, wherein each port of switch 110 can have an assigned cardinality, and hence a packet received at any particular port of switch 110 can instantly be forwarded towards the flow processing unit that is associated with the port. For instance, when a packet is received at an ingress port that corresponds to a south cardinal direction, the packet can be sent to the cardinal flow processing (CFP) unit associated with the south cardinal direction. As a result, each ingress port of SDN switch 110 may have an assigned cardinal direction and a mapping to one or more output ports, and the cardinal direction can be used by SDN switch 110 to facilitate forwarding of received packets. These cardinality-based directions can be used by datacenters to establish service function chains (SFCs), wherein northbound packets can, for instance, be used to denote network assets that process traffic upwards, towards the datacenter's external uplinks. In many cases, packets processed northward and/or ingress from the North can be to/from the datacenter's Internet connectivity. A service function chain represents an ordered sequence of networking functions that represent a packet's path through a given network architecture. Relative to SDN, the programmed flows result in a forwarding path that results in packets flowing across their defined SFCs.

In an exemplary implementation, each network interface/port can be associated with a specific cardinal direction (for example, North, East, South, or West), wherein the selected cardinal direction can indicate the cardinal flow processing (CFP) unit that will/can process packets that ingress into the network interface through a particular pre-defined port of SDN switch 110. Ingress packets received on a particular network interface can therefore be forwarded/mapped to appropriate/respective CFPs based on the assigned cardinal directions of the SDN ports/network interface on which they are received. The association of a cardinal direction to a network interface can be implicit or explicit relative to OpenFlow statements and their port indices, wherein implicit association can indicate that the port index value contains a value associated with the cardinal notation, whereas explicit value can indicate that a separate table is used to map port index values to corresponding cardinal directions. In both cases, each ingress packet can be mapped to an appropriate CFP unit based on the association of its network interface with an assigned cardinal direction. In an aspect, using implicit values allows SDN controller 108 (and the associated applications) to make use of cardinality in flow creation, whereas using explicit values results in more conventional port index values (which may be useful in connection with network element management and reporting) but requires coordination to ensure that they are being correctly used in flow statements. By using multiple CFP units, scalability in flow programmability can be achieved by assigning flows based on ingress port match values. If a given OpenFlow statement includes an ingress port (OXM_OF_IN_PORT) value, that value can be parsed (implicitly) or mapped (explicitly) to a cardinal direction, and the flow only needs to be programmed onto the CFP unit associated with that cardinal direction. However, if the ingress port is not specified, the flow can be programmed onto any of the CFP units based on their load, performance and/or configuration parameters. In an aspect, scalability can be provided even in support of a single-table pipeline since each of the four CFP units has its own relative table-0, and the flows programmed onto each are differentiated by ingress port values. It is a relatively straight forward process to collect and aggregate counters from the four CFP units back into a single-table representation. As a large number of flows can be associated with ingress ports, use of multiple CFP units allows linearly scaling the number of flows supported by the network security device/unit, in this case by a factor of four for the four CFP units representing the four cardinal directions. It is expressly contemplated that future network security devices/units may use larger numbers of CFP units, higher performance/capacity components within each CFP unit, and additional different ingress traffic discriminators than the four basic cardinal directions, in which case a combination of these factors can provide additional scalability of architecture 100.

In an aspect, orchestration engine 106 can be defined as the use of automation (e.g., use of software to reduce operational workload of configuration, troubleshooting and asset management), in order to provide services through the use of applications 102 that drive the network. SDN can be configured/interpreted as a collection of logical parts, and orchestration engine 106 has an ability to weave the logical parts together into a working fabric, which can move the entire data into a virtual universe. In an aspect, SDN controller 108 can be connected to the application layer via orchestration engine 106, which can be configured as a logical centralized entity that is in-charge of translating requirements from the SDN application layer down to the forwarding layer or say from the data path layer, and to provide the SDN applications with an abstract view of the network.

In an aspect, SDN controller 108 can handle all direct communications to network elements routed via orchestration engine 106. The operator directs SDN controller 108 as to what is needed, and the resources fall into place automatically. SDN controller 108 can have the ability to identify and correct network bottlenecks and other performance-inhibiting issues using a combination of advanced modelling and systems orchestration (which can happen across Ethernet, the OpenFlow Protocol and/or overlay networks). Also, in other terms, SDN controller 108 (also known as the "brains" of the network), offers a centralized view of the overall network, and enable network administrators to dictate to the underlying systems (like switches and routers) how the forwarding layer should handle network traffic.

In an exemplary implementation, the SDN switches such as SDN switch 110-1, SDN switch 110-2, SDN switch 110-3, and SDN switch 110-4, which may be collectively and interchangeably referred to as SDN switche(s) 110 or OpenFlow-enabled switches 110, can be programmed using the OpenFlow Protocol and SDN architecture 100. SDN switches 110 can be programmed to define how to match packets with the configured existing rules, and how to forward the packets based on one or more configurable/programmable rules. SDN switches 110 can be programmed to switch packets to/from the network security devices. In a typical implementation, when a data packet is received from real time traffic, SDN switches 110 determine the pipelines to be used for forwarding the packet toward the destination. When SDN switches 110 observe an unknown flow and/or cannot determine how to forward the packets, SDN switches 110 may consult SDN controller 108 to determine what to do with the flow, and then based on the configuration received from SDN controller 108, make the appropriate decision. In general, SDN switches 110 may include multiple tables for storing the rules based on which the forwarding decisions can be made. In an exemplary implementation, the multiple flow tables of SDN switches 110 can generally be stored in DRAM and/or TCAM devices.

Figure 2:
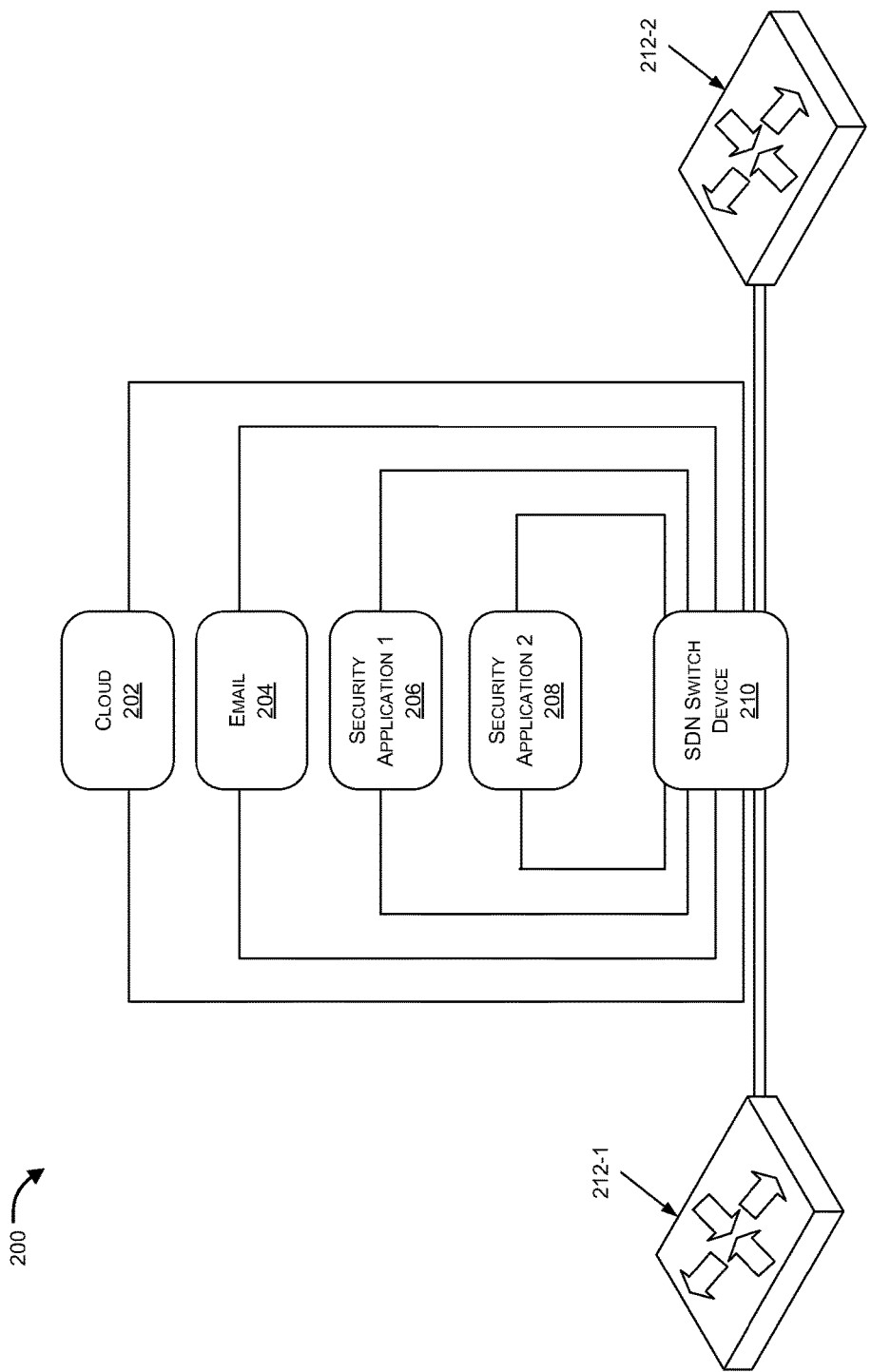
FIG. 2 illustrates another exemplary network architecture showing SDN switches being operatively coupled with end-devices in accordance with an embodiment of the present invention.

FIG. 2 illustrates another exemplary network architecture 200 showing SDN switches being operatively coupled with end-devices for implementation of aspects of the present disclosure. In an aspect, a logical view of SDN architecture 200 can include an SDN switch 210, receiving and routing data packets received from network devices such as 212-1 or 212-2 that can be configured and assigned for various security applications such as cloud-based applications 202, mail applications 204 and security applications 206 and 208. In an aspect, network intelligence can be (logically) centralized in one or more software-based SDN controller(s) that can maintain a global view of the network. As a result, the network appears to the applications and policy engines as a single logical switch or SDN switch device 210. SDN programmable switch 210 can remove scalability limitations in carrier and data center network security solutions, and can direct traffic to be inspected by a set of near-line security devices rather than requiring them to be in-line with the traffic flow. SDN programmable switch 210 allows network security solutions to be true line rate even on 40 G/100 G links. SDN switch device 210 can be SDN controlled, link-based, flow-programmable switching platform, which can be used to aggregate traffic on high-speed links and shunt traffic-of-interest to be inspected by associated, near-line network security appliances. SDN switch device 210 identifies the traffic of interest including transect mode and diffroute mode for the data packets coming from different network devices and directed towards destination devices, for example data packet coming from network device 212-1 can be directed towards network device 212-2.

In an exemplary implementation, SDN switch 210 can be configured to operate in TRANSECT mode to sit on a transected link between two active networking components, and redirect traffic-of-interest towards an appropriate network device for inspection based on the assigned cardinality. Traffic returned from security devices can be forwarded to the Northbound/Southbound interfaces as appropriate to the direction of traffic based on assigned cardinality of the ingress port/interface. In an aspect, SDN switch device 210 can consider different variables, including, but not limited to, the nature of the next hop device, for example, whether the next hop is an end device/organization or a security device for classifying the traffic of interest.

In an aspect, SDN switch device 210 can be configured to shunt traffic to/from a given organization associated with a security device and Layer 4 application type, meaning that IP sessions that originate from the organization and need to be evaluated can be sent to the appropriate network security device. For example, a packet received from an organization on the Northbound (originating) port/interface can be sent to a southbound port in expectation of receiving a reply from the southbound port, which may be connected with a network security device. Similarly IP sessions that originate externally from an organization on a southbound port/interface (originating) and that in need evaluation can be forwarded toward a northbound port/interface for reply. In both the IP session cases above (originating from within Organization and originating from outside the Organization), this information may be sufficient to direct traffic to the appropriate security device without the potential for best-match vs. first-match IP address logic conflicts between the SDN and its associated security devices.

In an exemplary implementation, SDN switch device 210 can operate in DIFFROUTE mode that can receive differentially routed traffic via encapsulation from security devices associated with the Southbound interface, and redirect traffic-of-interest towards security devices for inspection. Traffic returned from security devices can be forwarded to the Northbound interfaces toward device(s) required to maintain session integrity.

These cardinality based directions can be used by the datacenters to establish service function chains (SFCs). A service function chain represents an ordered sequence of networking functions that represent a packet's path through a given network architecture. Relative to SDN, the programmed flows result in a forwarding path that results in packets flowing across their defined SFCs. These applications can be designed and written to manipulate the logical network where the network operating system takes care of the detailed functions such as business applications, cloud orchestration and network applications. In an aspect, the network interface of an SDN switch device can be defined within a programmed flow statement. More than likely, the network interfaces are physical interfaces on SDN switch 210 but can potentially support logical interfaces as well.

In an aspect, IP traffic directed towards a given security device should be based on a minimal association between the source or destination of the traffic, irrespective of whether it is based on an IP address or a Virtual Local Area Network (VLAN) tag characteristic. In other words, SDN switch device 210 is only concerned with the forwarding of traffic through the solution and not filtering traffic, while the associated security devices are concerned with the inspection and filtering of traffic though the solution but have a pre-determined forwarding path. This results in the associated SDN switch devices 210 evaluating a given superflow through the solution differently, which in turn results in increased complexity in orchestration. However, the solution benefits as a whole since fewer programmed flows will be required to accomplish the solution's goals.

In an aspect, SDN switch device 210 of the present disclosure can programmatically control hardware traffic flows via software networking functions and open networking protocols (e.g., the OpenFlow Protocol). SDN and Network Function Virtualization (NFV) that virtualizes network functions within hypervisor environments can provide intelligent scaling of network security functions in large-scale and distributed environments, respectively.

In another aspect, the cardinal direction assigned SDN can support security functions that cannot be scaled using traditional load-balancing methods (e.g., Distributed Denial of Service (DDoS)). The cardinal direction assigned SDN can be used for high performance scalable security such as open Internet working. By using cardinal direction assigned SDN, multiple DDoS appliances can be used on a common high-performance link without affecting router configurations. Exceptions to DDoS inspection can also be programmed to bypass the SDN based DDoS units.

In yet another aspect, SDN switch device 210 of the present disclosure can be stateless flow-programmed devices with no requirement to synchronize state with a redundant unit. It is the function of the OpenFlow controller such as the SDN Sphere (a micro-controller operating as a virtual machine within the SDN appliance and converts basic policy statements into individual flow statements for use in programming the SDN unit), which can provide programmed flow synchronization across multiple units as well as detect switch failure. Configuration synchronization can be performed by orchestration, such as OpenStack or NETCONF. It is possible to use multiple SDN switches 210 to forward traffic to a common set of security devices while maintaining traffic symmetry.

Figure 3:
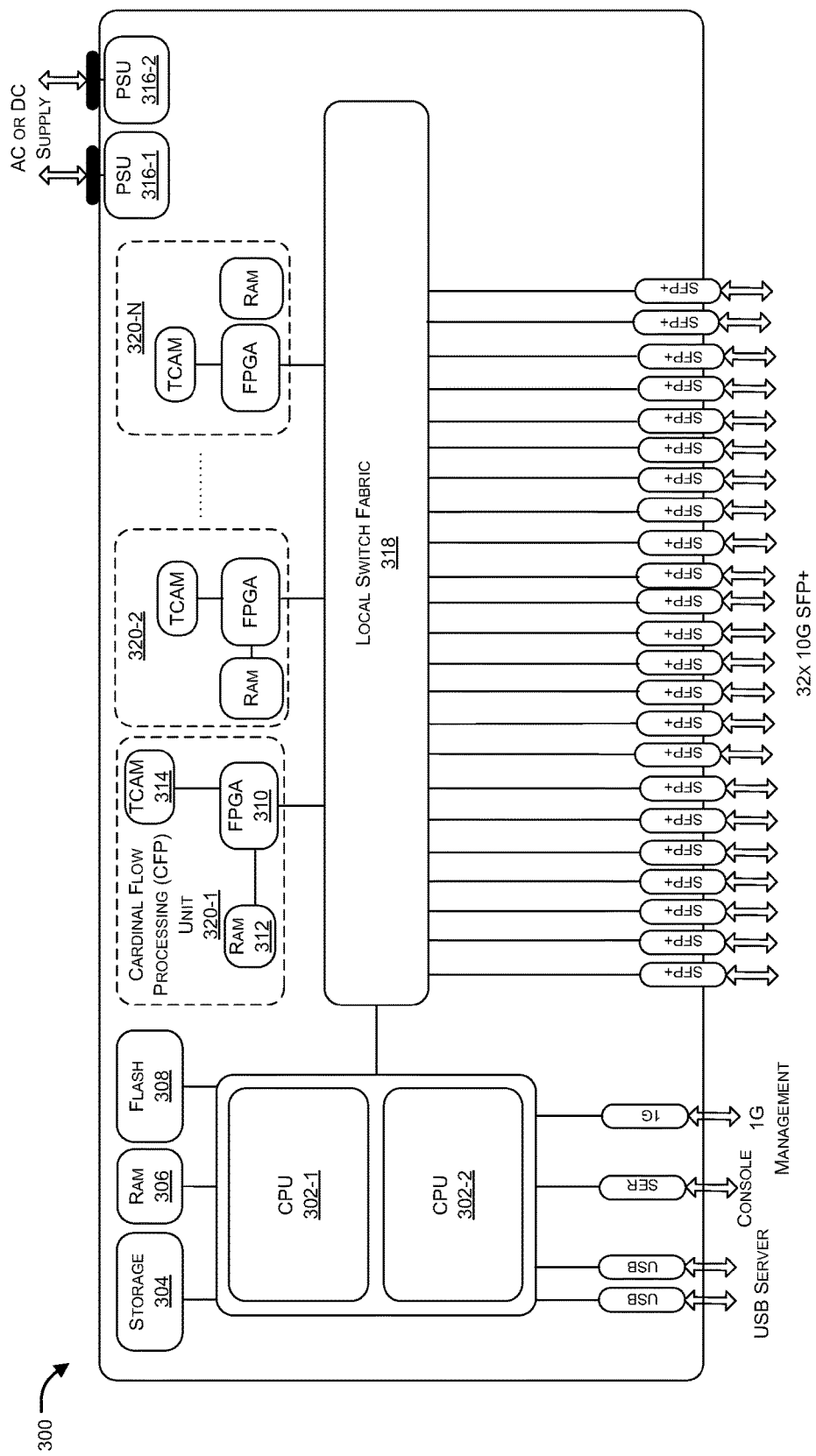
FIG. 3 illustrates an exemplary representation of an SDN switch architecture in accordance with an embodiment of the present invention.

FIG. 3 illustrates an exemplary representation of an SDN switch architecture 300 in accordance with an embodiment of the present invention. In an aspect, SDN switch 300 can include a supported network interface, for example 32×10 G SFP+ interfaces, a control layer CPU/RAM complex containing storage 304, RAM 306, flash 308, and CPU 302-1, CPU 302-2, which may have connectivity with USB server, console and 1 G management. Switch 300 can further include a local switch fabric 318 operatively coupled to multiple cardinal flow processing (CFP) units such as CFP unit 320-1, CFP unit 320-2 and CFP unit 320-N, which may be collectively and interchangeably referred to as CFP unit 320 hereinafter. In an exemplary implementation, each CFP unit 320 can include an FPGA 310, a RAM 312, and a TCAM 314.

In an embodiment, the CPU/RAM complex containing CPU 302-1 and CPU 302-2 may be connected to storage 304, RAM 306, Flash 308 and on the other hand to USB servers, console service and 1 G management. The dual multi-core CPU 302-1, CPU 302-2 and associated memory can be intended for control layer applications, receiving flow statements from the SDN controller, and programming CFP units 320. For pipeline security applications, daemons running on CPU 302 can act as micro controllers by converting network security intelligence data into flow statements locally. In an exemplary implementation, the CPU/RAM complex can be connected to a local switch fabric (LSF) 318 via, for instance, a 40 Gbps internal interface such that in the future, it may be possible to achieve scalable packet processing performance at the same level as CPU 302.

In another embodiment, SDN switch architecture 300 can include multiple network interfaces (e.g., the 32×10 G SFP+ interfaces) that can be enabled/disabled through a programmed flow statement. Although the SDN devices may have plural physical network interfaces, the SDN can be configured to support logical interfaces as well.

In an exemplary implementation, each network interface can be associated with a cardinal direction (North, East, South, or West) and the associated CFP unit. The selected cardinal direction can indicate which CFP unit will process packets that ingress into the network interface. The association of a cardinal direction to a network interface can be implicit or explicit relative to OpenFlow statements and their port indices, wherein implicit association means that the port index value contains a value associated with the cardinal notation, whereas explicit association means that a separate table can be used to map port index values to respective cardinal directions. In either case, ingress packets can be mapped to appropriate CFP units based on their association with the network interface's assigned cardinal direction. While performing this implicitly may result in an odd range of port values, using implicit values allows for SDN controllers (and their associated applications) to make use of cardinality in flow creation. Using explicit values can result in more conventional port index values (which may be important to network element management and reporting) but requires coordination to ensure that they are being correctly used in flow statements.

In an aspect, local switch fabric (LSF) 318 can be the primary forwarding engine that can forward packets between external network interfaces (e.g., 32×10 G SFP) and the four CFP units (from 320-1 to 320-n), and can also interface with the CPU/RAM complex (including storage 304, RAM 306, Flash 308 and CPU 302-1 and CPU 302-2 connected to USB server, Console and 1 G management). Generally, local switch fabric (LSF) 318 uses a simple interface mapping schema in which each of the network interfaces can be directly mapped to at least one CFP unit (from 320-1 to 320-n) for supporting ingress packet handling/forwarding. Packets from a CFP unit 320 can be forwarded to network interfaces for egress based on resulting output port index values. In local switch fabric 318, the term 'local' is used to connote the concept of the use of the local interface in OpenFlow Protocol switching. The local interface can be used as a go-between from the use of programmed flows to make forwarding decisions to forwarding based on the use of conventional L2/L3 protocols. LSF 318 may have underlying packet switching capabilities that are not generally in use or supported by the OpenFlow Protocol. By forwarding packets across the local interface, the SDN can use other capabilities of LSF 318 to forward and process packets. An example of this is Virtual Extensible LAN (VXLAN) support. VXLAN is an encapsulation protocol that has emerging use in datacenter architectures but is not currently supported within OpenFlow Protocol statements. If the SDN can forward packets to/from the local interface, it can make use of VXLAN functionality of LSF 318.

In an aspect, cardinal flow processing (CFP) units 320 represent a significant technical advancement when compared to other second-generation SDN switch designs. Each CFP unit 320 can include an FPGA 310, TCAM 314, and RAM 312, wherein FPGA 310 of the CFP unit can handle the overall packet processing through a pipeline, RAM 312 can provide cache memory for use by simple table structures within a multi-table pipeline, and TCAM 314 can provide network search processing for single-table pipelines, or for multi-table pipelines requiring complex search capabilities. To understand the operation of a CFP unit 320-1, it is necessary to understand how the OpenFlow Protocol uses pipelines to process packets. A pipeline is a set of tables used to match values contained within a packet header. For a single-table pipeline, with many of these fields requiring complex search capabilities, they would likely be mapped onto a TCAM 314. As noted earlier, the use of a single TCAM 314 would limit the number of flows that can be supported, and hence the number and capabilities of TCAM 314 can be increased based on the expected traffic that the SDN needs to manage.

CFP units 320 can be enhanced by using multiple FPGA units to provide scalability in flow programmability. If a given OpenFlow Protocol statement includes an ingress port value, that value can be parsed (implicitly) or mapped (explicitly) to a cardinal direction, and the flow only need to be programmed onto the CFP unit associated with that cardinal direction. However, if the ingress port is not specified, the flow can be programmed onto any/all of the CFP units 320. Scalability is provided even in support of a single-table pipeline since each of the four CFP units 320 has its own relative table, and the flows programmed onto each are differentiated by ingress port values. It is a relatively straightforward process to collect and aggregate counters from the four CFP units 320 back into a single-table representation. As an overwhelming number of flows will be associated with ingress ports, use of multiple CFP units 320 allows linear scaling of the number of flows supported by the SDN switch unit, in this case by a factor of four for the four CFP units 320 representing the four cardinal directions. Further, it is expressly contemplated that SDN switch units may use larger numbers of CFP units 320, higher performance/capacity components within each CFP unit 320, and additional and/or different ingress traffic discriminators than the four basic cardinal directions, in which a combination of these factors will provide additional scalability of this architecture.

In an exemplary aspect of FIG. 3, CFP unit 320-1 can be associated with the North cardinal direction, CFP unit 320-2 can be associated with the East cardinal direction, CFP unit 320-3 can be associated with the West cardinal direction, and CFP unit 320-4 can be associated with the South cardinal direction. In an aspect, CFP unit 320-4 associated with port having the South cardinal direction can be configured to identify a profile of the incoming packet or service chain to be followed for the incoming packet, based on which the incoming packet can be processed. Similarly, CFP unit 320-2 or 320-3 associated with a port having the East or West cardinal direction can be configured to identify whether an additional service is needed to be applied in a service chain or whether the incoming packet is to be forwarded to the destination. Accordingly, CFP unit 320-1 associated with a port having the North cardinal direction can be configured to check whether the incoming packet needs processing by services in the reverse path.

In an exemplary embodiment, incoming packets received at a port having the North cardinal direction can be indicative of packets that need processing by higher-tier components within the architecture (e.g., towards the Internet, and/or towards a public network space). On the other hand, incoming packets received at a port having the South cardinal direction can be indicative of packets that need processing by lower-tier components within the architecture (e.g., towards defined endpoint assets and/or towards a private network space). Similarly, incoming packets received at a port having the East cardinal direction can be indicative of packets that need processing by lateral common-tier components within the architecture, either within a data center or between data centers. Likewise, incoming packets received at a port having the West cardinal direction can be indicative of packets that need processing by lateral common-tier components within the architecture, either within a data center or between data centers.

In other words, a Northbound Interface is configured to handle traffic egressing the interface in which traffic is forwarded North. A Southbound Interface, on the other hand, is configured to handle traffic egressing the interface in which traffic is forwarded South. An Eastbound Interface is configured to handle traffic egressing the interface in which the traffic is forwarded East, wherein the Eastbound interface can denote an interface used by a device to send traffic to another device performing a network function. A Westbound interface, unlike other directional interfaces, is based on ingress, rather than egress traffic, wherein the Westbound interface is one that receives traffic from the East, and wherein the Westbound interface denotes an interface used by a device to receive traffic from another device which has performed a network function. As East and West represent traffic that is forwarded to and received from lateral or common-tier components with the architecture, it is often the case that a common interface can play both roles (such as in either a one-armed or otherwise bi-directional association between two devices), or that a set of Eastbound and Westbound interfaces in combination play both roles (as in forwarding traffic to/from a device that is parallel to the original device).

In an instance, architecture 300 can include four cardinal directions, wherein aspects of the present disclosure can receive differentially routed traffic via encapsulation from network devices associated with the Southbound interface for instance, and redirect traffic-of-interest towards network security devices for inspection. Traffic returned from the network security devices can be forwarded to the Northbound interfaces, towards device(s) required to maintain session integrity. Therefore, in an embodiment, traffic originating from within an organization can be Northbound and corresponding replies to one or more requests can be from the Southbound direction. Likewise, traffic originating from sources external to the organization can be Southbound and corresponding replies to one or more requests can be from the Northbound direction. In an aspect, architecture 300 increases flow table scaling as flows don't need to be replicated in different functional blocks. Furthermore, the present architecture automates port provisioning with a default profile based on port Cardinality, and enables flexible scaling of different functional blocks.

Figure 4:
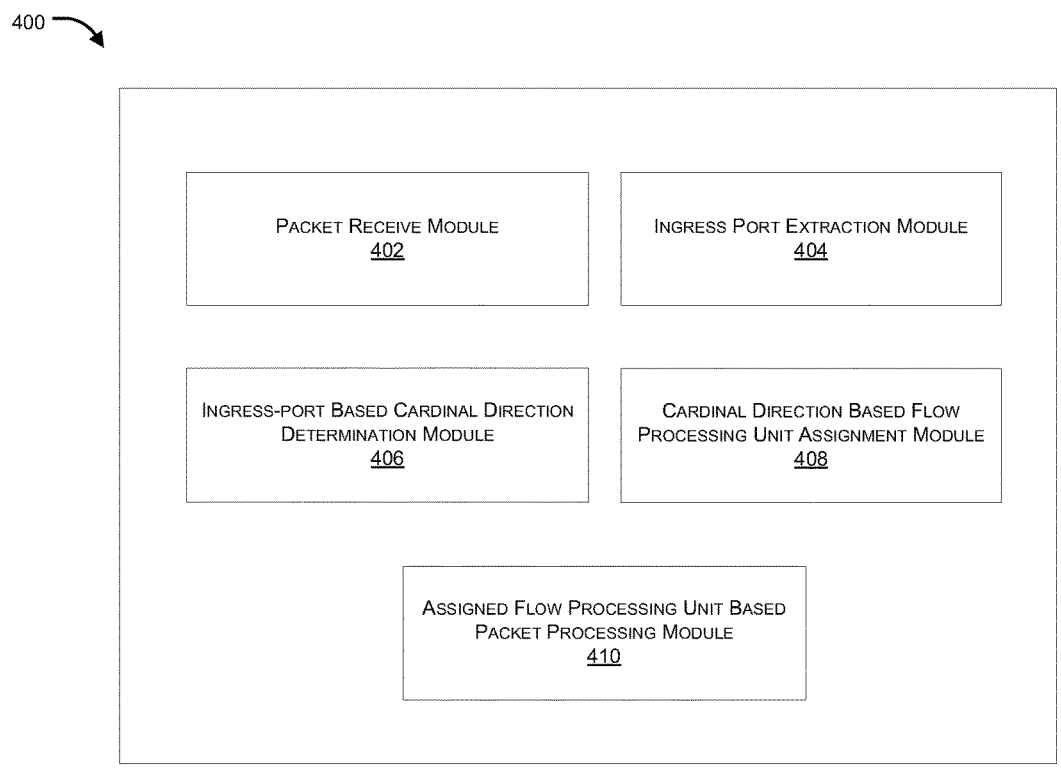
FIG. 4 illustrates exemplary functional modules of an SDN switch architecture in accordance with an embodiment of the present invention.

FIG. 4 illustrates exemplary functional modules of an SDN switch architecture 400 in accordance with an embodiment of the present invention. In an exemplary implementation, each port of the SDN switch unit can have an assigned cardinality, and each cardinal direction/cardinality can be mapped to a CFP unit. An embodiment of the present disclosure provides an SDN switch having a packet receive module 402 configured to, at an SDN switch, receive an incoming packet. The SDN switch can further include an ingress port extraction module 404 configured to determine the port on which the incoming packet was received, and an ingress-port based cardinal direction determination module 406 configured to determine the cardinal direction associated with the ingress-port. The SDN switch can further include a cardinal direction based flow processing unit assignment module 408 configured to determine a cardinal flow processing (CFP) unit from multiple CFP units to which the cardinal direction is mapped or otherwise associated with, and an assigned flow processing unit based packet processing module 410 configured to process the incoming packet at the determined CFP unit of the SDN switch. Each port of the SDN switch may have an assigned port index value that can be mapped to or otherwise associated with the cardinal direction that is indicative of the CFP unit of the SDN unit that is to process the incoming packet.

In an aspect, upon arrival of a packet from the network or from a network device, the SDN switch can parse the port index value and can quickly retrieve the cardinal direction and forward the packet to the respective CFP unit for further processing. In an exemplary implementation, the ports can be associated with a parameter selected from one or a combination of a defined port speed, a packet encapsulation characteristic, a port attribute, and/or a packet parameter, and wherein the parameter can be mapped to a second CFP unit from multiple CFP units. For instance, a network interface/port having higher processing speed can be mapped to a cardinal direction that is associated with a CFP unit having higher performance parameters/attributes to be able to efficiently process packets. Similarly, it may also be possible to have a many-to-one or one-to-many mapping between cardinal directions and CFP units, and even between ports and CFP units. For instance, it is possible that more than one CFP units are mapped for the North cardinal direction such that an incoming packet received on a port having the North cardinal direction can be sent to any of the assigned CFP units based on their respective loads, performance and/or other parameters. Such assignment of packets to CFP units can also be done in a round-robin fashion. As mentioned above, the CFP units can include an FPGA for processing an incoming packet through a pipeline, a TCAM that is configured to provide network search processing, and a memory for storing/cache the flow processing rules/keys. In an exemplary implementation, the cardinal direction to which the port can be mapped may be selected from South, North, East, and West Directions. In alternative embodiments, the ports may be mapped to other enumerated values not necessarily related to cardinal directions.

In an exemplary implementation, each of the ingress ports may have an assigned cardinality, and hence upon receiving a data packet from a network, the SDN switch can forward the packet to an appropriate CFP unit for processing and making the forwarding decision based on the cardinality of the port on which the packet was received. By having assigned cardinality to each of the ingress ports, the SDN switches implementing features of the present disclosure area able to achieve performance improvements as very little time is needed to make a determination by the SDN switch regarding the CFP unit to which to forward the received packet for processing.

Although exemplary embodiments of the present disclosure have been described with respect to each ingress port having one associated CFP unit based on their assigned cardinalities, it is expressly contemplated that more than one CFP unit may be assigned and/or mapped to any particular ingress port. As those skilled in the art will appreciate, each CFP unit may be associated with one or more ingress ports, and can process the packets received from such assigned/mapped ingress port(s). In an exemplary implementation, based on the ingress port with which the CFP units are mapped/associated, the respective rules/keys for making the forwarding decision can be stored in the CFP units.

In an exemplary embodiment, operation of a CFP unit includes use of OpenFlow Protocol pipelines to process packets, wherein a pipeline is a set of tables used to match values contained within a packet header. For instance, OpenFlow Protocol pipelines can currently support up to 256 tables (0-255), which is a significant change from prior OpenFlow pipelines, which only supported a single table. At a minimum, an SDN switch can be required to support a single-table pipeline with the following 13 match values as follows: OXM_OF_IN_PORT—Ingress port, OXM_OF_ETH_DST—Ethernet destination address, OXM_OF_ETH_SRC—Ethernet source address, OXM_OF_ETH_TYPE—Ethernet type of the OpenFlow packet payload (after VLAN tags), OXM_OF_IP_PROTO—IPv4 or IPv6 protocol number, OXM_OF_IPV4_SRC—IPv4 source address, OXM_OF_IPV4_DST—IPv4 destination address, OXM_OF_IPV6_SRC—IPv6 source address, OXM_OF_IPV6_DST—IPv6 destination address, OXM_OF_TCP_SRC—TCP source port, OXM_OF_TCP_DST—TCP destination port, OXM_OF_UDP_SRC—UDP source port, and OXM_OF_UDP_DST—UDP destination port.

In an aspect, a CFP unit can use multiple units to achieve scalability in flow programmability by assigning flows based on the ingress port match values. If a given OpenFlow statement includes an ingress port (OXM_OF_IN_PORT) value, that value can be parsed (implicitly) or mapped (explicitly) to a cardinal direction, and the flow can be programmed into the CFP unit associated with that cardinal direction. However, if the ingress port is not specified, the flow can be programmed into all of the CFP units. Scalability can be provided even in support of a single-table pipeline, since each of the four CFP units has its own relative table-0, and the flows programmed onto each are differentiated by ingress port values. It is a relatively straightforward process to collect and aggregate counters from the four CFP units back into a single-table representation.

As a large number of flows can be associated with each ingress port, the use of multiple CFP units facilitates linearly scaling the number of flows supported by architecture 400, in this case, by a factor of four for the four CFP units representing the four cardinal directions. Those skilled in the art will appreciated that SDN architectures/units may use a greater number of CFP units, higher performance/capacity components within each CFP unit, and additional and/or different ingress traffic discriminators other than the four basic cardinal directions identified herein, in which a combination of these factors will provide additional scalability to architecture 400.

Figure 5B:
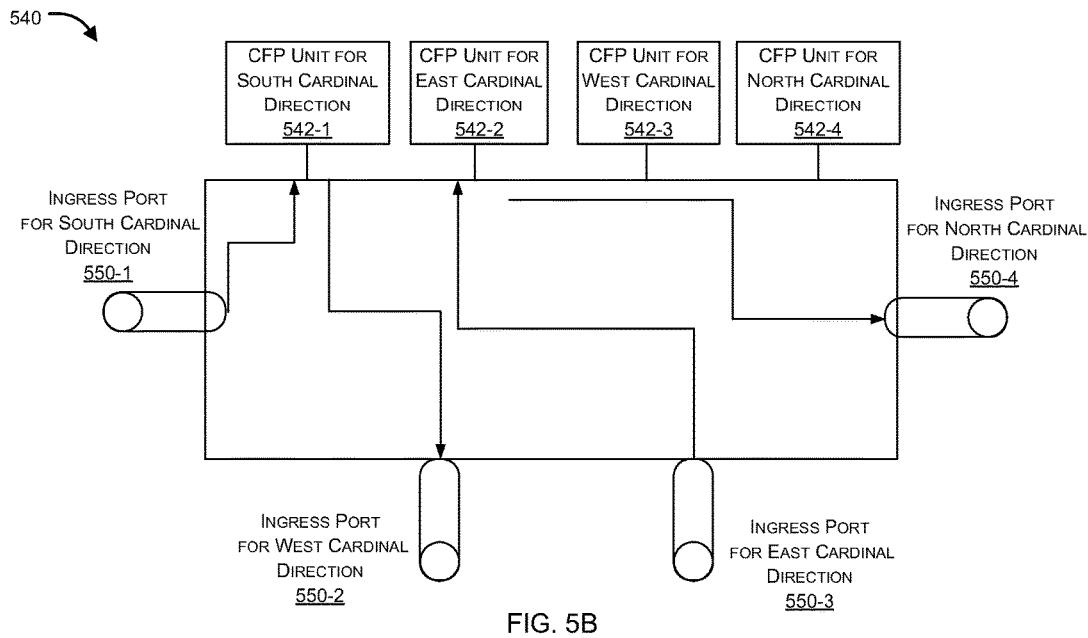
Figure 5C:
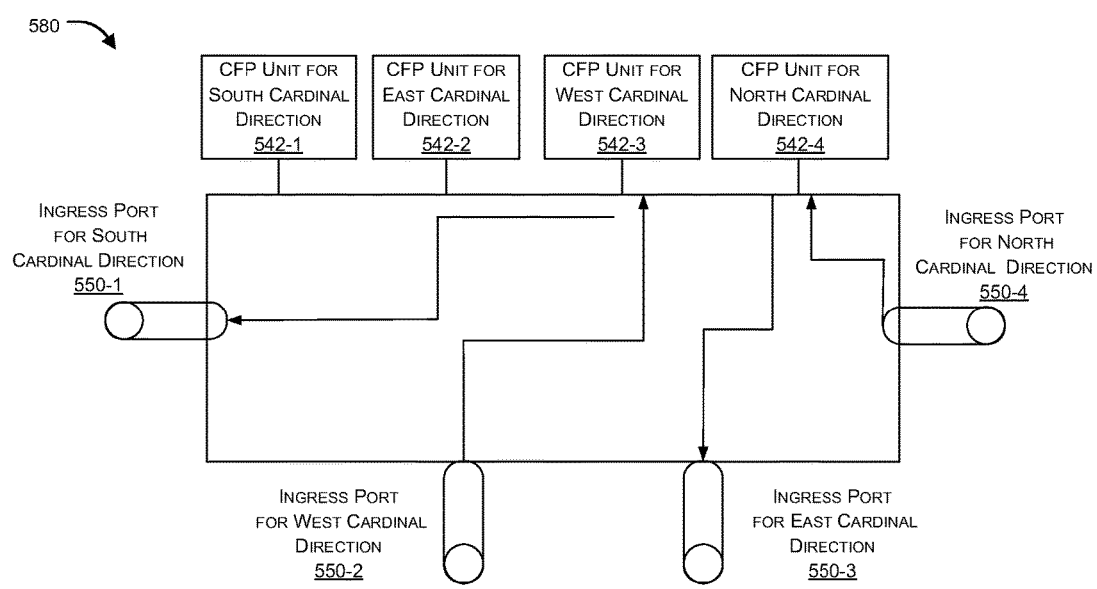

FIGS. 5A-5C illustrate an exemplary mapping between ports and cardinal directions, and between cardinal directions and CFP units responsible for processing packets received on ports mapped to particular cardinal directions in accordance with an embodiment of the present invention. As can be seen in FIG. 5A, in an instance, an SDN switch can include four ingress ports having respective port values 504 and assigned cardinal directions 502, wherein an ingress port having the South cardinal direction can have a port value of Port-S-001 (550-1), an ingress port having the West cardinal direction can have a port value Port-W-001 (550-2), and so on. Similarly, each port/port value/cardinal direction can be associated with or mapped to a cardinal flow processing (CFP) unit 506, wherein for instance, a port having the North cardinal direction can have a port value of Port-N-001 (550-4) and can be assigned to CFP unit CFP-N 542-4. Similarly, a port having the East cardinal direction can have a port value of Port-E-001 (550-3) and can be assigned to CFP unit CFP-N 542-4.

In one embodiment, as illustrated with respect to FIG. 5B, a packet received on an ingress port associated with the south cardinal direction 550-1 can be directed to CFP unit 542-1 that is mapped to ports having south cardinal direction. In the context of the present example, such a packet can then be processed by CFP unit 542-1 and might be sent to say a port having the west cardinal direction associated therewith. Similarly, a packet received on an ingress port associated with the east cardinal direction 550-3 can be directed to CFP unit 542-2 that is mapped to ports having east cardinal direction. In the context of the present example, such a packet can then be processed by CFP unit 542-2 and might be sent to say a port having north cardinal direction associated therewith.

Turning now to FIG. 5C, along similar lines, a packet received on an ingress port associated with the north cardinal direction 550-4 can be directed to CFP unit 542-4 that is mapped to ports having north cardinal direction. In the context of the present example, such a packet can then be processed by CFP unit 542-4 and might be sent to say port 550-3 having east cardinal direction associated therewith. Continuing with the example illustrated by FIG. 5C, a packet received on an ingress port having the west cardinal direction 550-2 can be directed to CFP unit 542-3 that is mapped to ports having west cardinal direction. This packet can then be processed by CFP unit 542-3 and subsequently might be sent to say port 550-1 having south cardinal direction associated thereto.

Figure 6:
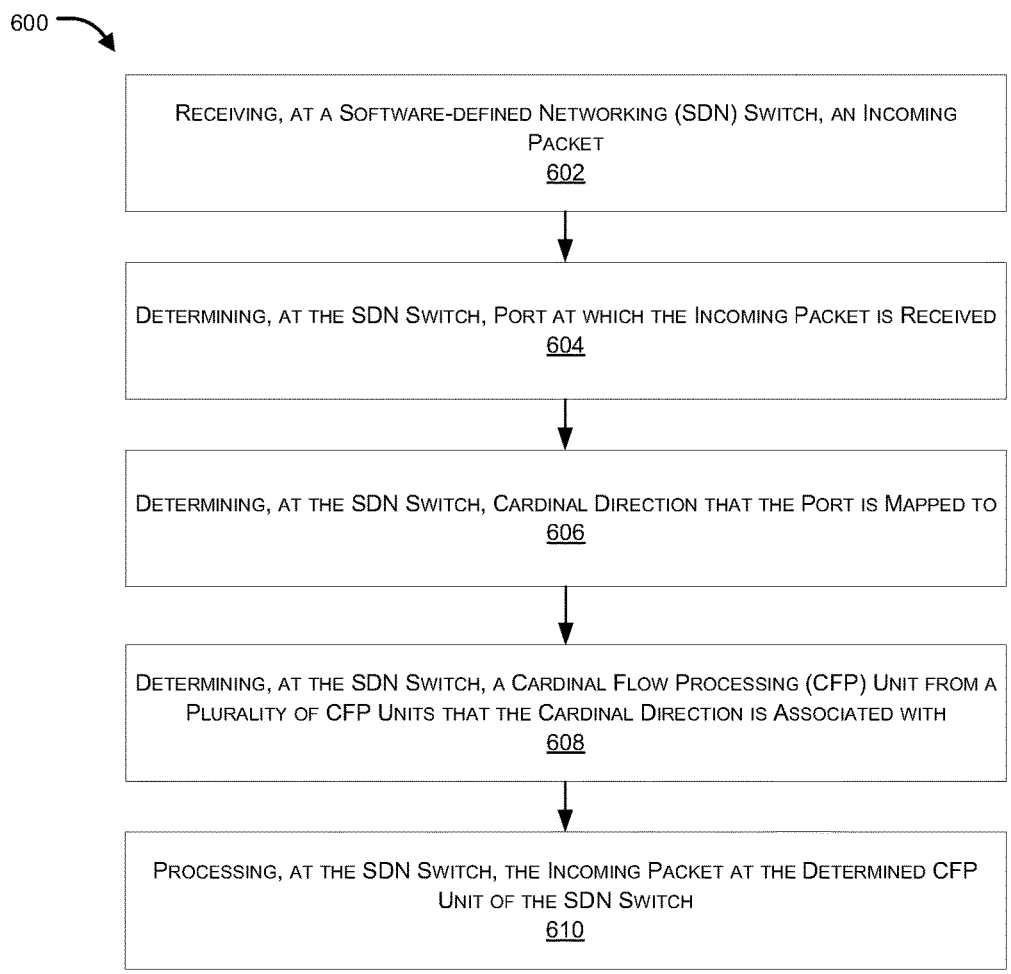
FIG. 6 illustrates an exemplary flow diagram showing processing of incoming packets by an SDN switch in accordance with an embodiment of the present invention.

FIG. 6 illustrates an exemplary flow diagram 600 showing processing of incoming packets by an SDN switch in accordance with an embodiment of the present invention. At step 602, an SDN switch can receive an incoming packet, and at step 604, determine the port on which the incoming packet was received. At step 606, a cardinal direction to which the port is mapped is identified, and at step 608, a CFP unit associated with the cardinal direction is identified and used at step 610, to process the incoming packet.

If the specification states a component or feature "may", "can", "could", or "might" be included or have a characteristic, that particular component or feature is not required to be included or have the characteristic.

Although the present disclosure has been described with the purpose of conducting network auditing, it should be appreciated that the same has been done merely to illustrate the disclosure in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A software-defined networking (SDN) switch comprising:
a plurality of ports, each port of the plurality of ports being associated with a respective port value; and
a plurality of cardinal flow processing (CFP) units, wherein at least one port of the plurality of ports is directly mapped to at least one CFP unit such that an incoming packet having an ingress port value corresponding to the at least one port is processed by the at least one CFP unit and wherein each of the plurality of CFP units comprises a Field Programmable Gate Array (FPGA) that controls processing of incoming packets through a flow table pipeline including one or more flow tables, a ternary content addressable memory (TCAM) providing network search processing of the one or more flow tables on behalf of the FPGA, and a memory configured as a cache memory in which flow processing rules of the one or more flow tables are cached during the processing of the incoming packets through the flow table pipeline.

2. The SDN switch of claim 1, wherein the ingress port value of the at least one port is associated with a cardinal direction of a plurality of cardinal directions, and wherein the cardinal direction is associated with the at least one CFP unit.

3. The SDN switch of claim 2, wherein a representation of the ingress port value of the at least one port contains a cardinal notation corresponding to the cardinal direction.

4. The SDN switch of claim 2, wherein the ingress port value of the at least one port is mapped with its respective cardinal notation based on a table.

5. The SDN switch of claim 2, wherein the cardinal direction that the at least one port is associated with is selected from South, North, East, and West cardinal directions.

6. The SDN switch of claim 5, wherein a CFP unit of the plurality of CFP units mapped to a port of the plurality of ports associated with the South cardinal direction is configured to identify a profile of the incoming packet or a service chain to be followed for the incoming packet.

7. The SDN switch of claim 5, wherein a CFP unit of the plurality of CFP units mapped to a port associated with the East cardinal direction or the West cardinal direction is configured to identify whether an additional service is needed to be applied in a service chain or whether the incoming packet is to be forwarded to a destination specified by the incoming packet.

8. The SDN switch of claim 5, wherein a CFP unit of the plurality of CFP units mapped to a port associated with the North cardinal direction is configured to check whether the incoming packet is to be processed by services in a reverse path.

9. The SDN switch of claim 2, wherein the SDN switch is operatively coupled with an SDN controller, and wherein the SDN controller stores information specifying cardinal directions that are associated with one or more of the plurality of ports.

10. The SDN switch of claim 1, wherein the incoming packet is parsed by the SDN switch to retrieve the ingress port value indicated by the incoming packet.

11. The SDN switch of claim 1, wherein the at least one port is associated with a parameter selected from one or a combination of a defined port speed, a packet encapsulation characteristic, a port attribute, or a packet parameter, and wherein the parameter is associated with the at least one CFP unit.

12. The SDN switch of claim 1, wherein the TCAM is configured to handle a single-table pipeline or a multi-table pipeline.

13. The SDN switch of claim 1, wherein the SDN switch further comprises a central processing unit (CPU) configured to receive flow statements from SDN controller that the SDN switch is associated with, and wherein the CPU is configured to program the plurality of CFP units.

14. The SDN switch of claim 13, wherein the SDN switch further comprises a local switch fabric configured as a forwarding engine to forward the incoming packet between external network interfaces, the plurality of CFP units, and the CPU.

15. A software-defined networking (SDN) switch comprising:
a non-transitory storage device having embodied therein a plurality of routines operable process packets; and
a central processing unit (CPU) coupled to the non-transitory storage device and operable to execute the plurality of routines, wherein the plurality of routines includes:
a packet receive module, which when executed by the CPU receives from an ingress port of the SDN switch an incoming packet;
an ingress port extraction module, which when executed by the CPU determines the ingress port of a on which the incoming packet was received;
an ingress-port based cardinal direction determination module, which when executed by the CPU determines a cardinal direction with which the determined ingress port is associated; and
a cardinal direction based flow processing unit assignment module, which when executed by the CPU identifies a cardinal flow processing (CFP) unit of a plurality of CFP units within the SDN switch by which the incoming packet is to be processed based on the determined cardinal direction;
wherein the identified CFP unit comprises a Field Programmable Gate Array (FPGA) that controls processing of the incoming packet through a flow table pipeline including one or more flow tables, a ternary content addressable memory (TCAM) providing network search processing of the one or more flow tables on behalf of the FPGA and a cache memory in which flow processing rules of the one or ore flow tables are cached during the processing of the incoming packet through the flow table pipeline; and
wherein the identified CFP unit processes the incoming packet prior to forwarding the incoming packet to its intended destination.

16. The SDN switch of claim 15, wherein the ingress port has a port index value, wherein the port index value is mapped to the associated cardinal direction that is indicative of the CFP unit of the plurality of the plurality of CFP units that is to process the incoming packet.

17. The SDN switch of claim 16, wherein the port index value is parsed to retrieve the cardinal direction.

18. The SDN switch of claim 16, wherein the cardinal direction is retrieved from a table that maps the port index value to the cardinal direction.

19. The SDN switch of claim 15, further comprising at least one port that is associated with a parameter selected from one or a combination of a defined port speed, a packet encapsulation characteristic, a port attribute, or a packet parameter, and wherein the parameter is mapped to a second CFP unit of the plurality of CFP units.

20. The SDN switch of claim 15, wherein the cardinal direction to which the ingress port is mapped is selected from South, North, East and West.

21. A method comprising:
receiving, by a software-defined networking (SDN) switch, an incoming packet;
determining, by the SDN switch, an ingress port on which the incoming packet was received;
determining, by the SDN switch, a cardinal direction to which the ingress port is mapped;
identifying, by the SDN switch, a cardinal flow processing (CFP) unit of a plurality of CFP units within the SDN switch with which the determined cardinal direction is associated; and
processing, by the SDN switch, the incoming packet by the identified CFP unit, wherein the CFP unit comprises a Field Programmable Gate Array (FPGA) that controls processing of the incoming packet through a flow table pipeline including one or more flow tables, a ternary content addressable memory (TCAM) that is configured to provide network search processing of the one or more flow tables on behalf of the FPGA, and a memory configured as a cache memory in which flow processing rules of the one or more flow tables are cached during the processing of the incoming packet through the flow table pipeline.

22. The method of claim 21, wherein the ingress port has a port index value, wherein the port index value is mapped to the associated cardinal direction that is indicative of the CFP unit of the plurality of CFP units that is to process the incoming packet.

23. The method of claim 22, wherein the port index value is parsed to retrieve the cardinal direction.

24. The method of claim 22, wherein the cardinal direction is retrieved from a table that maps the port index value to the cardinal direction.

25. The method of claim 21, wherein at least one port of the SDN switch is associated with a parameter selected from one or a combination of a defined port speed, a packet encapsulation characteristic, a port attribute, or a packet parameter, and wherein the parameter is mapped to a second CFP unit of the plurality of CFP units.

26. The method of claim 21, wherein the cardinal direction to which the ingress port is mapped is selected from South, North, East and West.

* * * * *